United States Patent [19]

McKenzie et al.

[11] Patent Number: 4,820,361

[45] Date of Patent: Apr. 11, 1989

[54] EMULSION EXPLOSIVE CONTAINING ORGANIC MICROSPHERES

[75] Inventors: Lee F. McKenzie, Riverton; Lawrence D. Lawrence, Sandy, both of Utah

[73] Assignee: IRECO Incorporated, Salt Lake City, Utah

[21] Appl. No.: 128,096

[22] Filed: Dec. 3, 1987

[51] Int. Cl.$^4$ .............................................. C06B 45/00
[52] U.S. Cl. ........................................ 149/2; 149/46; 149/61; 149/83
[58] Field of Search ........................ 149/2, 46, 61, 83

[56] References Cited

U.S. PATENT DOCUMENTS 4,357,184  11/1982  Binet et al. ............................... 149/2

Primary Examiner—Stephen J. Lechert, Jr.

[57] ABSTRACT

The present invention relates to an improved explosive composition. More particularly, the invention relates to a water-in-oil emulsion explosive having improved stability and a lower viscosity. The term "water-in-oil" means a dispersion of droplets of an aqueous solution or water-miscible melt (the discontinuous phase) in an oil or water-immiscible organic substance (the continuous phase). The term "explosive" means both cap-sensitive explosives and noncap-sensitive explosives commonly referred to as blasting agents. The water-in-oil emulsion explosives of this invention contain a water-immiscible organic fuel as the continuous phase and an emulsified inorganic oxidizer salt solution or melt as the discontinuous phase. (The terms "solution" or "melt" hereafter shall be used interchangeably.) These oxidizer and fuel phases react with one another upon initiation by a blasting cap and/or a booster to produce an effective detonation. The explosives contain a polypropene or polybutene derivatized water-in-oil emulsifier and a density reducing agent in the form of expanded organic microspheres having a nonpolar surface and comprising homo-, co- or terpolymers of vinyl monomers (hereafter "organic microspheres"). This combination of polypropene or polybutene derivatized emulsifier and organic microspheres has been found to be particularly advantageous in the water-in-oil emulsion explosives of the present invention.

9 Claims, No Drawings

EMULSION EXPLOSIVE CONTAINING ORGANIC MICROSPHERES

BACKGROUND OF THE INVENTION

Water-in-oil emulsion explosives are well-known in the art. See, for example, U.S. Pat. Nos. 4,356,044; 4,322,258; 4,141,767; 3,447,978 and 3,161,551. Emulsion explosives are found to have certain advantages over conventional aqueous slurry explosives, which have a continuous aqueous phase, as described in U.S. Pat. No. 4,141,767.

An inherent problem with emulsion explosives, however, is their relative instability, due to the fact that they comprise a thermodynamically unstable dispersion of supercooled solution or melt droplets in an oil-continuous phase. If the emulsion remains stable, these supercooled droplets are prevented from crystallizing or solidifying into a lower energy state. If the emulsion weakens or becomes unstable, however, then crystallization or solidification of the droplets results, and the explosive generally loses some of its sensitivity to detonation and becomes too viscous to handle for certain blasting applications. Moreover, it is common to add solid components to emulsion explosives in the form of glass microspheres for density reduction and prills or particles of oxidizer salt such as porous prilled ammonium nitrate (AN) for increased energy. These solid components, however, tend to destabilize emulsions.

Emulsion explosives commonly are used as a repumpable explosive, i.e., an explosive that is formulated at a remote facility, loaded or pumped into a bulk container and then transported in the container to a blasting site where it then is "repumped" from the container into a borehole. Alternatively, the explosive may be delivered (repumped) into a centrally located storage tank from which it will be further repumped into a vehicle for transportation to a blasting site and then again repumped into the borehole. Thus the emulsion explosive must remain stable even after being subjected to repeated handling or shearing action, which normally also tends to destabilize an emulsion. Additionally, the emulsion—s viscosity must remain low enough to allow for repumping at reasonable pressures and at the low ambient temperatures that may be experienced during colder months. Repeated handling or shearing action also tends to increase the emulsion—s viscosity.

Since a density control agent is required in many instances to reduce the density of an explosive and thereby increase its sensitivity to a required level for detonation, and since hollow microspheres are a preferred form of density control, it is important that the emulsion remain stable and have a low viscosity even when containing solid density control agents. Heretofore, stability has been a significant problem in repumpable emulsion explosives containing solid density control agents. Moreover, certain types of solid density control agents are more destabilizing to emulsions than others. For example, at 20° C. one of the more commonly used emulsifiers, sorbitan monooleate, forms a relatively stable emulsion in the presence of glass microspheres but is less effective in the presence of organic microspheres.

A major advantage of the present invention is that the use of a polypropene or polybutene derivatized emulsifier in combination with organic microspheres as the solid density control agent imparts improved stability and lower viscosity to the emulsion, even after repeated handling or shearing action. Another advantage is that the use of polypropene or polybutene derivatized emulsifiers allows for organic microspheres to be used as a density control agent without adversely affecting the stability of the emulsion. Still another advantage is that the organic microspheres are a reactive fuel, rather than an inert like glass microspheres, and thus contribute to the detonation reaction. The presence of organic microspheres in compositions of the present invention has been found to result generally in higher detonation velocities, higher detonation sensitivities and lower critical diameters.

SUMMARY OF THE INVENTION

The invention relates to a water-in-oil emulsion explosive comprising a water-immiscible organic fuel as a continuous phase; an emulsified aqueous inorganic oxidizer salt solution as a discontinuous phase; a polypropene or polybutene derivatized emulsifier; and organic microspheres as a density reducing agent.

DETAILED DESCRIPTION OF THE INVENTION

The immiscible organic fuel forming the continuous phase of the composition is present in an amount of from about 3% to about 12%, and preferably in an amount of from about 4% to about 8% by weight of the composition. The actual amount used can be varied depending upon the particular immiscible fuel(s) used and upon the presence of other fuels, if any. The immiscible organic fuels can be aliphatic, alicyclic, and/or aromatic and can be saturated and/or unsaturated, so long as they are liquid at the formulation temperature. Preferred fuels include tall oil, mineral oil, waxes, paraffin oils, benzene, toluene, xylenes, mixtures of liquid hydrocarbons generally referred to as petroleum distillates such as gasoline, kerosene and diesel fuels, and vegetable oils such as corn oil, cottonseed oil, peanut oil, and soybean oil. Particularly preferred liquid fuels are mineral oil, No. 2 fuel oil, paraffin waxes, microcrystalline waxes, and mixtures thereof. Aliphatic and aromatic nitrocompounds also can be used. Mixtures of the above can be used. Waxes must be liquid at the formulation temperature.

Optionally, and in addition to the immiscible liquid organic fuel, solid or other liquid fuels or both can be employed in selected amounts. Examples of solid fuels which can be used are finely divided aluminum particles; finely divided carbonaceous materials such as gilsonite or coal; finely divided vegetable grain such as wheat; and sulfur. Miscible liquid fuels, also functioning as liquid extenders, are listed below. These additional solid and/or liquid fuels can be added generally in amounts ranging up to 15% by weight. If desired, undissolved oxidizer salt can be added to the composition along with any solid or liquid fuels.

The inorganic oxidizer salt solution forming the discontinuous phase of the explosive generally comprises inorganic oxidizer salt, in an amount from about 45% to about 95% by weight of the total composition, and water and/or water-miscible organic liquids, in an amount of from about 2% to about 30%. The oxidizer salt preferably is primarily ammonium nitrate, but other salts may be used preferably in amounts up to about 20%. The other oxidizer salts are selected from the group consisting of ammonium, alkali and alkaline earth metal nitrates, chlorates and perchlorates. Of these, sodium nitrate (SN) and calcium nitrate (CN) are preferred. From about 10% to about 65% of the total oxidizer salt may be added in particle or prill form.

Water generally is employed in an amount of from about 2% to about 30% by weight based on the total composition. It is preferably employed in an amount of from about 10% to about 20%. Water-miscible organic liquids can partially replace water as a solvent for the salts, and such liquids also function as a fuel for the composition. Moreover, certain organic liquids reduce the crystallization temperature of the oxidizer salts in solution. Miscible liquid fuels can include alcohols such as methyl alcohol, glycols such as ethylene glycols, amides such as formamide, and analogous nitrogen-containing liquids. As is well known in the art, the amount and type of liquid(s) used can vary according to desired physical properties.

The emulsifiers of the present invention are derivatives of polypropene or more preferably polyisobutylene, and preferably are used in an amount of from about 0.2% to about 5%. Since most isobutylene feedstocks are contaminated with 1-butene and 2-butene, certain manufacturers use the terms polybutene and polyisobutylene interchangeably or designate polymers derived from predominantly isobutylene feedstocks as "polybutenes." As used herein, the term "polybutene" shall include polyisobutylene. Similarly, the term "polypropene" shall include polypropylene. In emulsifiers prepared from such polymers, the polybutene or polypropene moieties form the hydrophobic ends of the emulsifier molecules. The molecular weights of hydrocarbon chains which are useful in the present application may vary from 300 to 3000, but more preferably are from 500 to 1500 g/mole and particularly preferably from 700 to 1300 g/mole.

Hydrophilic moieties may be attached directly to the terminal double bond on polypropene or polyisobutylene chains, or may be attached via an intermediate linking group. The type of hydrophilic groups which are effective include acid anhydrides, carboxylic acids, amides, esters, amines, alcohols, oxazolines, imides or combinations thereof.

One type of linking group between hydrophilic and hydrophobic parts of these "polymeric emulsifiers" is succinic anhydride. The terminal olefin on polypropene or polyisobutylene is reacted with maleic anhydride via an "ene" reaction. The resulting polybutenyl or polypropenyl succinic anhydride readily reacts with amines or alcohols to form amides or esters. Depending upon the ratio of reactants and reaction conditions, mixed derivatives are possible. For example, if polybutenyl succinic anhydride is reacted at lower tempeatures with one molar equivalent of ethanolamine, ring opening of the anhydride occurs with the formation of amide or ester and carboxylic acid functional groups. Further heating of the product can be done to remove one equivalent of water and form an imide. If two equivalents of ethanolamine are reacted with polybutenyl succinic anhydride with sufficient heat to remove water, bis-amide bis-ester and mixed amide/ester products are possible.

A second type of linking group for polyisobutylene or polypropylene polymeric emulsifiers is phenol. The terminal olefinic group on polyisobutylene, for example, can be reacted with phenol via a Friedel-Crafts alkylation. Hydrophilic functionality can then be attached to the polyisobutenyl phenol via reaction with formaldehyde and a polyamine such as tetraethylene pentamine.

Direct attachment of hydrophilic groups on polyisobutylene or polypropene can be done in a variety of ways. The terminal olefin on polybutene, for example, can be halogenated. Reaction of the resulting alkyl halide with an amine or polyamine can then be accomplished via bimolecular nucleophilic substitution of halide ion by amine. Similarly, polybutenyl epoxide can be reacted with acids or amines to attach a hydrophilic moiety onto a polybutene chain without the aid of a linking group.

The emulsifiers of the present invention can be used singly, in various combinations or in combination(s) with conventional emulsifiers such as sorbitan fatty esters, glycol esters, substituted oxazolines, alkyl amines or their salts, derivatives thereof and the like.

The compositions of the present invention are reduced from their natural densities by addition of organic microspheres as a density reducing agent in an amount sufficient to reduce the density to within the range of from about 0.9 to about 1.5 g/cc. The preferred organic microspheres are copolymers of vinylidine chloride and acrylonitrile with an isobutane blowing agent. Other density reducing agents that may be additionally used include perlite and chemical gassing agents, such as sodium nitrite, which decomposes chemically in the composition to produce gas bubbles.

One of the main advantages of a water-in-oil explosive over a continuous aqueous phase slurry is that thickening and cross-linking agents are not necessary for stability and water resistance. However, such agents can be added if desired. The aqueous solution of the composition can be rendered viscous by the addition of one or more thickening agents and cross-linking agents of the type commonly employed in the art.

The explosives of the present invention may be formulated in a conventional manner. Typically, the oxidizer salt(s) first is dissolved in the water (or aqueous solution of water and miscible liquid fuel) at an elevated temperature of from about 25° C. to about 90°C., depending upon the crystallization temperature of the salt solution. The aqueous solution then is added to a solution of the emulsifier and the immiscible liquid organic fuel, which solutions preferably are at the same elevated temperature, and the resulting mixture is stirred with sufficient vigor to invert the phases and produce an emulsion of the aqueous solution in a continuous liquid hydrocarbon fuel phase. Usually this can be accomplished essentially instantaneously with rapid stirring. (The compositions also can be prepared by adding the liquid organic to the aqueous solution.) Stirring should be continued until the formulation is uniform. The solid ingredients, including the organic microspheres then are added and stirred throughout the formulation by conventional means. The formulation process also can be accomplished in a continuous manner as is known in the art.

It has been found to be advantageous to predissolve the emulsifier in the liquid organic fuel prior to adding the organic fuel to the aqueous solution. This method allows the emulsion to form quickly and with minimum agitation.

Sensitivity and stability of the compositions may be improved slightly by passing them through a high-shear system to break the dispersed phase into even smaller droplets prior to adding the density control agent.

Reference to the following Table further illustrates the invention.

TABLE

| INGREDIENTS | Mix No.: 1 | 2 | 3 | 4 | 5 | 6 | 7 | 8 | 9 | 10 | 11 |
|---|---|---|---|---|---|---|---|---|---|---|---|
| AN | 63.7 | 64.7 | 63.7 | 64.7 | 63.5 | 64.8 | 63.1 | 64.8 | 63.1 | 64.8 | 63.1 |
| CN (a) | 14.9 | 15.1 | 14.9 | 15.1 | 14.8 | 15.1 | 14.7 | 15.1 | 14.7 | 15.1 | 14.7 |
| H$_2$O | 12.1 | 12.2 | 12.1 | 12.2 | 12.3 | 12.6 | 12.3 | 12.6 | 12.3 | 12.6 | 12.3 |
| #2 Fuel Oil | 4.37 | 4.44 | 4.37 | 4.44 | 5.73 | 5.85 | 5.70 | 5.85 | 5.70 | 5.85 | 5.70 |
| Mineral Oil | 1.32 | 1.34 | 1.32 | 1.34 | | | | | | | |
| Emulsifier: | | | | | | | | | | | |
| (b) | 1.09 | 1.11 | | | | | 1.09 | 1.12 | | | |
| (c) | | | 1.09 | 1.11 | 1.10 | 1.12 | | | 1.09 | 1.12 | |
| (d) | | | | | | | | | | | 1.09 |
| (e) | | | | | | | | | | | |
| (f) | | | | | | | | | | | |
| (g) | | | | | | | | | | | |
| (h) | | | | | | | | | | | |
| Density Control: | | | | | | | | | | | |
| (i) | 2.50 | | 2.50 | | | | | | | | |
| (j) | | | | | 2.50 | | 3.00 | | 3.00 | | 3.00 |
| (k) | | 1.00 | | 1.00 | | 0.50 | | 0.50 | | 0.50 | |
| Density g/cc | | | | | 1.23 | 1.17 | 1.17 | 1.19 | 1.19 | 1.19 | 1.18 |
| Storage Temp. °C. | 20° | 20° | 20° | 20° | −22° | −22° | −13° | −13° | −13° | −13° | −13° |
| Initial Viscosity at Storage Temp (cps) | 15,720 | 12,440 | 16,880 | 11,200 | 28,200 | 23,480 | 22,200 | 19,880 | 33,760 | 22,200 | 20,400 |
| Weekly Stress Mixing Rate (rpm) | 1000 | 1000 | 1000 | 1000 | 1000 | 1000 | 500 | 500 | 500 | 500 | 500 |
| Degree of Crystallization: | | | | | | | | | | | |
| 1 Week | None | None | Slight | None | Slight | None | None | Slight | Slight | None | Slight |
| 2 Weeks | Slight | Slight | Slight | Slight | Heavy | Mod. | Slight | Slight | Mod. | Slight | Heavy |
| 3 Weeks | Sight | Mod. | Slight | Slight | | Mod. | | | | | |
| 4 Weeks | Mod. | Heavy | Mod. | Slight | | Heavy | | | | | |
| 5 Weeks | Heavy | | Mod. | Slight | | | | | | | |
| 6 Weeks | | | Mod. | Slight | | | | | | | |
| 7 Weeks | | | Mod. | Slight | | | | | | | |
| 8 Weeks | | | Mod. | Slight | | | | | | | |

| INGREDIENTS | Mix No. 12 | 13 | 14 | 15 | 16 | 17 | 18 | 19 | 20 | 21 | 22 |
|---|---|---|---|---|---|---|---|---|---|---|---|
| AN | 64.8 | 63.1 | 64.8 | 63.1 | 64.8 | 63.1 | 64.8 | 63.3 | 64.9 | 61.9 | 61.9 |
| CN (a) | 15.1 | 14.7 | 15.1 | 14.7 | 15.1 | 14.7 | 15.1 | 14.7 | 15.1 | 13.9 | 13.9 |
| H$_2$O | 12.6 | 12.3 | 12.6 | 12.3 | 12.6 | 12.3 | 12.6 | 12.3 | 12.6 | 16.6 | 16.6 |
| #2 Fuel Oil | 5.85 | 5.70 | 5.85 | 5.70 | 5.85 | 5.70 | 5.85 | 6.09 | 6.24 | 4.48 | 3.99 |
| Mineral Oil | | | | | | | | | | 1.40 | 1.40 |
| Emulsifier: | | | | | | | | | | | |
| (b) | | | | | | | | | | | |
| (c) | | | | | | | | | | 1.12 | |
| (d) | 1.12 | | | | | | | | | | 1.13 |
| (e) | | 1.09 | 1.12 | | | | | | | | |
| (f) | | | | 1.09 | 1.12 | | | | | | |
| (g) | | | | | | 1.09 | 1.12 | | | | |
| (h) | | | | | | | | 0.71 | 0.73 | | |
| Density Control: | | | | | | | | | | | |
| (i) | | | | | | | | | | | |
| (j) | | 3.00 | | 3.00 | | 3.00 | | 3.00 | | | |
| (k) | 0.50 | | 0.50 | | 0.50 | | 0.50 | | 0.50 | 0.60 | 0.60 |
| Density g/cc | | | | | | | 1.21 | | | 1.12 | 1.13 |
| Storage Temp °C. | −13° | −13° | −13° | −13° | −13° | −13° | −13° | −13° | −13° | | |
| Initial Viscosity at Storage Temp (cps) | 18,280 | — | 23,600 | — | 29,560 | >40,000 | 25,960 | >40,000 | >40,000 | | |
| Weekly Stress Mixing Rate (rpm) | 500 | 500 | 500 | 500 | 500 | 500 | 500 | 500 | 500 | | |
| Degree of Crystallization: | | | | | | | | | | | |
| 1 Week | Slight | Heavy | Slight | Heavy | Slight | Mod. | Slight | Mod. | Slight | | |
| 2 Weeks | Mod. | — | Mod. | — | Slight | Heavy | Heavy | Heavy | Heavy | | |
| 3 Weeks | | | | | | | | | | | |
| 4 Weeks | | | | | | | | | | | |
| 5 Weeks | | | | | | | | | | | |
| 6 Weeks | | | | | | | | | | | |
| 7 Weeks | | | | | | | | | | | |

TABLE-continued

8 Weeks

Key:
(a) Fertilizer grade CN comprising 81:14:5 CN:H₂O:AN
(b) Sorbitan monocleate
(c) The reaction product of 1018 mol. wt. polybutenyl succinic anhydride and two equivalents of trishydroxymethyl amino methane. The active component is diluted to 65% activity with #2 fuel oil.
(d) A 920 ave. mol. wt. polybutene, derivatized with a low molecular weight polyethylene polyamine via a phenolic linking group. The active ingredient is diluted to 45% activity with a petroleum distillate.
(e) A low mol. wt. polyethylene polyamine derivative of a polyisobutenyl succinic anhydride.
(f) An alkanolamine derivative of polyisobutenyl succinic anhydride diluted with a petroleum distillate.
(g) The reaction product of 1018 mol. wt. polyisobutenyl succinic anhydride and one molar equivalent of diethanolamine. The active ingredients were diluted to 65% activity with #2 fuel oil.
(h) Undiluted polyisobutenyl succinic anhydride with an average mol. wt. of 1018.
(i) C15/250 glass microspheres from 3M.
(j) B23/500 glass microspheres from 3M.
(k) 551 DE organic microspheres from Expancel.

The examples in the Table indicate that to obtain the same composition density, glass microspheres were required in a weight amount of about six times that required with the organic microspheres used.

Data in the Table indicate that in all cases lower viscosity compositions are obtained with organic microspheres than with glass microspheres at a similar composition density. For example, at −22° C. in Mixes 5 and 6, glass microspheres gave a product viscosity of 28,200 cps while organic microspheres gave a product viscosity of 23,480 cps.

At 20° C. compositions with polybutene derivatized emulsifier have much better stability than compositions prepared with sorbitan monooleate, a commonly used emulsifier (see Mixes 1–4). Furthermore, at 20° C. emulsions having a polybutene derivatized emulsifier in combination with organic microspheres (Mix 4) are more stable than formulations with glass microspheres (Mix 3). This appears to be opposite of what was found when sorbitan monooleate was the emulsifier, since a composition with glass microspheres was slightly more stable than one with organic microspheres (compare Mixes 1 and 2). (Sorbitan monooleate produced somewhat more stability at −13° C., however, than did the polybutene derivatives.)

Mixes 9–12 illustrate that two types of polybutene derivatized emulsifiers gave better cold temperature stability when used with organic microspheres than with glass microspheres.

Detonation results were obtained for Mixes 21 and 22. At 5° C., Mix 21 detonated in a 75 mm diameter charge at 5.77 km/sec and had a minimum booster of 4.5 g pentolite and a 25 mm critical diameter. At −15° C., the respective figures were 5.52 km/sec, 4.5 g and 32 mm. Similarly, the respective figures for Mix 22 at 5° C. were 5.52 km/sec, 4.5 g and 25 mm. The respective figures for Mix 22 at −15° C. were 5.77 km/sec, 4.5 g and 32 mm.

The compositions of the present invention can be used in the conventional manner. The compositions normally are loaded directly into boreholes as a bulk product although they can be packaged, such as in cylindrical sausage form or in large diameter shot bags. Thus the compositions can be used both as a bulk and a packaged product. The compositions generally are extrudable and/or pumpable with conventional equipment. The above-described properties of the compositions render then versatile and economically advantageous for many applications.

While the present invention has been described with reference to certain illustrative examples and preferred embodiments, various modifications will be apparent to those skilled in the art and any such modifications are intended to be within the scope of the invention as set forth in the appended claims.

What is claimed is:

1. A water-in-oil emulsion explosive comprising a water-immiscible organic fuel as a continous phase; an emulsified aqeous inorganic oxidizer salt solution as a discontinuous phase; an emulsifier selected from the group consisting of polypropenyl or polybutenyl succinic anhydride and polypropenyl or polybutenyl phenol, each of which has been derivatized with an alcohol, amine or alkanolamine; and organic microspheres as a density control agent.

2. An explosive according to claim 1 wherein the density reducing agent is present in an amount sufficient to reduce the density of the explosive to within the range of from about 1.0 to about 1.5 g/cc.

3. An explosive according to claim 2 wherein the density reducing agent is a copolymer of vinylidine chloride and acrylonitrile.

4. An explosive according to claim 1 wherein the emulsifier is a derivative of trishydroxymethylaminomethane and polybutenyl succinic anhydride.

5. An explosive according to claim 1 wherein the emulsifier is a polyalkylenepolyamine derivative of polybutenyl phenol.

6. A blasting agent according to claim 1 wherein the organic fuel is selected from the group consisting of tail oil, mineral oil, waxes, benzene, toluene, xylene, petroleum distillates such as gasoline, kerosene, and diesel fuels, and vegetable oils such as corn oil, cottonseed oil, peanut oil and soybean oil.

7. An explosive according to claim 1 wherein the inorganic oxidizer salt is selected from the group consisting of ammonium and alkali and alkaline earth metal nitrates, chlorates and perchlorates and mixtures thereof.

8. An explosive according to claim 7 wherein the inorganic oxidizer salt comprises ammonium nitrate in an amount of from about 10% to about 40% by weight.

9. A water-in-oil emulsion explosive comprising a water-immiscible organic fuel as a continuous phase in an amount of from about 3% to about 12% by weight based on the total composition; and emulsified aqueous inorganic oxidizer salt solution as a discontinuous phase, comprising inorganic oxidizer salt in an amount of from about 20% to about 55% and water in an amount of from about 10% to about 20%; particulate oxidizer salt in an amount of from about 35% to about 65% an emulsifier selected from the group consisting of polypropenyl or polybutenyl succinic anhydride and polypropenyl or polybutenyl phenol, each of which has been derivatized with an alcohol, amine or alkanolamine in an amount of from about 0.1% to about 5% and organic microspheres as a density reducing agent in an amount sufficient to reduce the density of the explosive to within the range from about 1.0 to about 1.5 g/cc.

* * * * *